(12) United States Patent
Wang

(10) Patent No.: US 9,892,432 B2
(45) Date of Patent: Feb. 13, 2018

(54) BIDDING BASED ON THE RELATIVE VALUE OF IDENTIFIERS

(71) Applicant: Google Inc., Mountain View, CA (US)

(72) Inventor: Gang Wang, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/694,045

(22) Filed: Sep. 1, 2017

(65) Prior Publication Data

US 2017/0364964 A1    Dec. 21, 2017

Related U.S. Application Data

(63) Continuation of application No. 14/271,816, filed on May 7, 2014, now Pat. No. 9,767,488.

(51) Int. Cl.
*G06Q 30/00* (2012.01)
*G06Q 30/02* (2012.01)

(52) U.S. Cl.
CPC .................. *G06Q 30/0275* (2013.01)

(58) Field of Classification Search
CPC ....................................... G06Q 30/02
See application file for complete search history.

(56) References Cited

U.S. PATENT DOCUMENTS

| | | | |
|---|---|---|---|
| 6,161,127 A | 12/2000 | Cezar et al. | |
| 7,039,699 B1 | 5/2006 | Narin et al. | |
| 7,698,166 B2 | 4/2010 | Flake | |
| 7,805,332 B2 | 9/2010 | Wilson | |
| 8,386,599 B2 | 2/2013 | Fomitchev | |
| 8,874,652 B1 | 10/2014 | Pecjak | |
| 2003/0014304 A1 | 1/2003 | Calvert | |
| 2007/0088609 A1* | 4/2007 | Reller | G06Q 30/02 705/14.71 |
| 2008/0071594 A1 | 3/2008 | Morin | |
| 2009/0100047 A1* | 4/2009 | Jones | G06F 17/30648 |
| 2010/0228850 A1 | 9/2010 | Fomitchev | |
| 2010/0262498 A1 | 10/2010 | Nolet | |
| 2011/0314092 A1* | 12/2011 | Lunt | G06F 17/30876 709/203 |
| 2012/0245990 A1 | 9/2012 | Agarwal | |
| 2013/0124329 A1* | 5/2013 | Tengler | G06Q 30/0269 705/14.66 |

FOREIGN PATENT DOCUMENTS

WO    WO 2007/136177    11/2007

\* cited by examiner

*Primary Examiner* — Vincent Cao
(74) *Attorney, Agent, or Firm* — Fish & Richardson P.C.

(57) ABSTRACT

Methods, systems, and apparatus include computer programs encoded on a computer-readable storage medium, including a method for providing content. A linking is provided of identifiers for users or devices known to a content delivery service. Each identifier is associated with the user or device in a specific context. The linking includes first and second identifiers. A request for content is received that includes either the first or second identifier. Bidders in an exchange are identified that have expressed an interest in bidding on a content delivery opportunity associated with the user or the device. For each bidder, a relative value is determined for a respective bidder for the opportunity to present content to the user or device in association with each identifier known to the bidder. For each bidder, a real-time bid request is generated in the exchange that includes the highest value identifier for submission to a respective bidder.

19 Claims, 7 Drawing Sheets

380

Provide a linking of a plurality of identifiers for a user or a device that is known to a service, the service being a content delivery service that delivers content from inventory responsive to received requests for content, wherein each identifier is associated with the user or the device in a specific context, the linking including a first and second identifier  382

Receive a request for content, the request for content including either the first or the second identifier  384

Identify, using one or more processors, bidders in an exchange that have expressed an interest in bidding on a content delivery opportunity associated with the user or the device based on the received first or second identifier  386

Determine, for each bidder, a relative value to a respective bidder of the opportunity to present content to the user or the device in association with each identifier that is known to the respective bidder including, when the first and second identifiers are known to the bidder, determining a highest value identifier from among the first and second identifier  388

Generate, for each bidder, a real-time bid request in the exchange that includes the highest value identifier for submission to a respective bidder.  390

FIG. 3B

BIDDING BASED ON THE RELATIVE VALUE OF IDENTIFIERS

CROSS-REFERENCE TO RELATED APPLICATION

This is a continuation of U.S. application Ser. No. 14/271,816, filed on May 7, 2014, the disclosure of which is considered part of and is incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can then be provided to the user on any devices associated with the user such as a home personal computer (PC), a smartphone, a laptop computer, or some other user device.

SUMMARY

In general, one innovative aspect of the subject matter described in this specification can be implemented in methods that include a computer-implemented method for providing content. The method includes providing a linking of a plurality of identifiers for a user or a device that is known to a service, the service being a content delivery service that delivers content from inventory responsive to received requests for content, wherein each identifier is associated with the user or the device in a specific context, the linking including a first and second identifier. The method further includes receiving a request for content, the request for content including either the first or second identifier. The method further includes identifying, using one or more processors, bidders in an exchange that have expressed an interest in bidding on a content delivery opportunity associated with the user or the device based on the received first or second identifier. The method further includes for each bidder: determining a relative value to a respective bidder of the opportunity to present content to the user or the device in association with each identifier that is known to the respective bidder including, when the first and second identifiers are known to the bidder, determining a highest value identifier from among the first and second identifier; and generating a real-time bid request in the exchange that includes the highest value identifier for submission to a respective bidder.

These and other implementations can each optionally include one or more of the following features. Providing the linking can include providing a linking of plural cookies that are associated with a single user or a single device. The request for content can include a first cookie, and generating the real-time bid request can include generating a bid request for a respective bidder that includes a second different cookie. Determining the relative value can include estimating the relative value. Estimating the relative value can be based, at least in part, on previous bidding frequency and amounts of bidder bids on a respective identifier. Estimating can include periodically updating the estimates based on bidder activities in the exchange. Determining the relative value can include looking up a stored value provided by a respective bidder. The method can further include determining if a relative value has been provided by a bidder, and when so, using the provided relative value, and when not, estimating the relative value. Estimating the relative value can be based at least in part on prior bidding activity of the bidder. The method can further include providing the real-time bid request to the bidder. The method can further include using the linking for conversion tracking. The context can be a specific resource associated with content presented to the user or the device, and the context can be characterized by one or more context types, including: previous behavior exhibited by the user or the device, demographics associated with the user, user profile information for the user, user interests, device characteristics associated with the device, and/or entities associated with content presented to the user or the device. Determining the relative value can be based, at least in part, on the context types.

In general, another innovative aspect of the subject matter described in this specification can be implemented in computer program products that include a computer program product tangibly embodied in a computer-readable storage device and comprising instructions. The instructions, when executed by one or more processors, cause the processor to: provide a linking of a plurality of identifiers for a user or a device that is known to a service, the service being a content delivery service that delivers content from inventory responsive to received requests for content, wherein each identifier is associated with the user or the device in a specific context, the linking including a first and second identifier; receive a request for content, the request for content including either the first or second identifier; identify, using one or more processors, bidders in an exchange that have expressed an interest in bidding on a content delivery opportunity associated with the user or the device based on the received first or second identifier; and for each bidder: determine a relative value to a respective bidder of the opportunity to present content to the user or the device in association with each identifier that is known to the respective bidder including, when the first and second identifiers are known to the bidder, determining a highest value identifier from among the first and second identifier; and generate a real-time bid request in the exchange that includes the highest value identifier for submission to a respective bidder.

These and other implementations can each optionally include one or more of the following features. Providing the linking can include providing a linking of plural cookies that are associated with a single user or a single device. The request for content can include a first cookie, and generating the real-time bid request can include generating a bid request for a respective bidder that includes a second different cookie. Determining the relative value can include estimating the relative value.

In general, another innovative aspect of the subject matter described in this specification can be implemented in systems, including a system comprising one or more processors and one or more memory elements including instructions. The instructions, when executed, cause the one or more processors to: provide a linking of a plurality of identifiers for a user or a device that is known to a service, the service being a content delivery service that delivers content from inventory responsive to received requests for content, wherein each identifier is associated with the user or the device in a specific context, the linking including a first and second identifier; receive a request for content, the request for content including either the first or second identifier; identify, using one or more processors, bidders in an exchange that have expressed an interest in bidding on a content delivery opportunity associated with the user or the device based on the received first or second identifier; and for each bidder: determine a relative value to a respective bidder of the opportunity to present content to the user or the device in association with each identifier that is known to the respective bidder including, when the first and second identifiers are known to the bidder, determining a highest value identifier from among the first and second identifier; and generate a real-time bid request in the exchange that includes the highest value identifier for submission to a respective bidder.

These and other implementations can each optionally include one or more of the following features. Providing the linking can include providing a linking of plural cookies that are associated with a single user or a single device. The request for content can include a first cookie, and generating the real-time bid request can include generating a bid request for a respective bidder that includes a second different cookie.

Particular implementations may realize none, one or more of the following advantages. Linking identifiers and determining relative values of the identifiers can be performed with or without direct client input. Linking can be performed in accordance with permissions and consent and the linked information can be kept private so to avoid unauthorized use and/or data leakage issues. Content sponsors can be prevented from obtaining cookie linkage information and applying the knowledge in other environments (such as other content exchanges) to buy impressions for the same users, perhaps at lower cost.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a flowchart of an example process for generating real-time bid requests based on relative values to bidders of identifiers associated with content requests.

Like reference numbers and designations in the various drawings indicate like elements.

DETAILED DESCRIPTION

Figure 1:
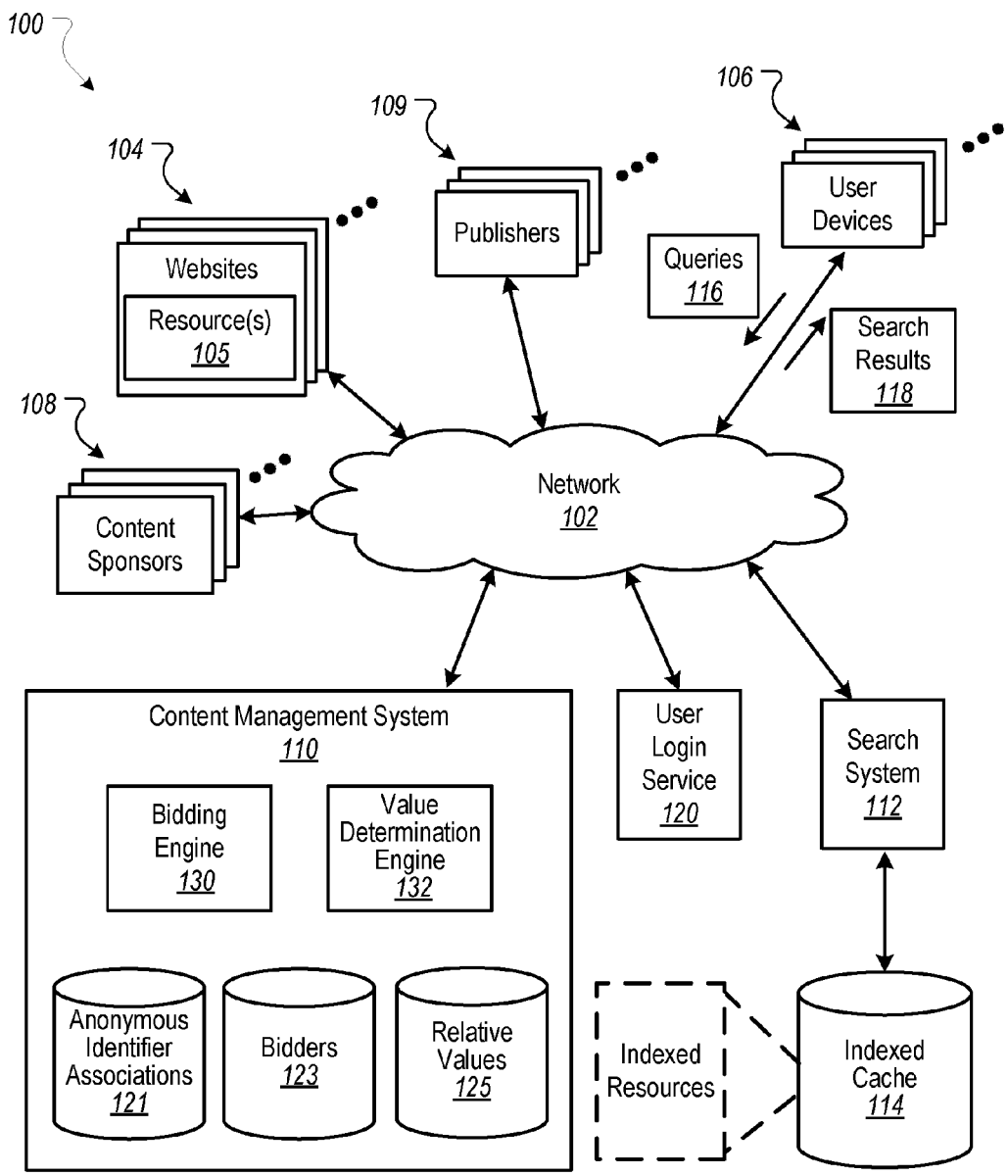
FIG. 1 is a block diagram of an example environment for delivering content.

Methods, processes and systems are described for generating real-time bid requests in an exchange (e.g., an ad exchange) based on relative values to bidders of identifiers associated with content requests. For example, a bid may be received in an exchange. The bid may be associated with an identifier, such as of the form of a cookie. The identifier may be linked by the exchange or known to be linked by the exchange or another system, to other identifiers, forming a linking of plural identifiers that are associated with a single user. In, for example, a real-time bidding system, requests that are received for impressions can be provided to bidders that subscribe to user lists or otherwise designate certain users as being of interest to the prospective bidder. Rather than just provide an identifier that is received in association with a request, a different identifier can be provided to a prospective bidder for the request. The different identifier can be of the form of an identifier that has a highest value to the bidder. Values of bids are discussed in greater detail below. For example, for each bidder on a content delivery opportunity (i.e., an impression), a relative value can be determined for the one or more identifiers that are known to be associated with a received request. A first identifier associated with the request can form part of the request or accompany the request. One or more second identifiers can be linked to the first identifier. For each of the first and the one or more second identifiers for a given bidder, a value can be determined. In some implementations, relative values can be determined for identifiers that are linked, such as identifiers associated with the same user (e.g., when using multiple different devices or different browsers or applications on a same device) or identifiers associated with linked devices. Example methods for linking identifiers are provided below. Other ways are possible for establishing identifier linkages (e.g., cookie linkages). Generated bid requests can be used for selecting content responsive to received requests for content.

Relative values can be based, for example, on a user's intentions, interests and/or profile, some of which can be determined by analyzing the user's recent and past online activity. Information associated with a user's online activity can be linked to a particular identifier (e.g., a cookie). A user can have multiple devices, and each device can have one or more identifiers (e.g., web browser cookies) stored thereon based on one or more interactions the user may have had on a respective device. Other identifiers are possible, such as unique device identifiers that may be used, for example, by mobile apps as a substitute for browser cookies. A user's entire online activity can be represented and/or segmented by multiple identifiers (e.g., cookies or device IDs). Identifiers that are linked can be used to consolidate or join information for the same user or the same device.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

In an ad exchange scenario, for example, the ad exchange can link identifiers (e.g., cookies or device IDs) from multiple devices, applications or browsers and the identifiers can be associated with the same owner. When requests for content (e.g., ads) are received from such an owner (e.g., a user or device), information about the linking can be used to assist in identifying potential bidders for fulfilling the request as well as provided value information to a respective bidder to assist the entity in forming a realistic bid. Linking of identifiers can be performed automatically, as described below.

In some implementations, providing content to a user having or being associated with multiple devices can be performed without storing personally identifiable information associated with the user to facilitate content selection. For example, when a user logs onto a user service from a first device (e.g., the user's home PC), a user tag can be determined that uses a unique identifier associated with the user (e.g., the user's email address, phone number or other personal information). To determine the user tag, the unique identifier can be obfuscated, e.g., using a one-way cryptographic hash to create a random or pseudo-random number. The user tag can be mapped to the user's first device. Subsequently, when the user logs into the service from a second different device, the same user tag can also be mapped to the second different device. The mapping in these examples can use anonymous identifiers (e.g., cookies, browser cookies, device identifiers, etc.) that are associated with each device. As a result, the mapping can identify all of the devices associated with the user without storing personally identifiable information (PII) associated with the user. When content is subsequently provided to the user on any of the devices, information included in the mapping can be used to assist in selecting relevant content to be provided to the user. The selection of relevant content can include decisions regarding how content is delivered to the user, such as and including, limitations on when or how content is delivered. For example, the number of impressions of an advertisement can be limited to a fixed number of impressions per user per time period regardless of how many devices the user uses. In some implementations, users may be provided with an opportunity to opt in/out of programs or features that allow the user to be discovered across multiple devices and/or to be provided content based on such occurrences.

In some implementations, the mapping process can be repeated periodically to ensure that the anonymous identifiers (e.g., cookies) are not stale. For example, cookies on a computer can expire over time, or a user can clear a cookie, resulting in setting a new cookie. Repeating the cookie-mapping process periodically can ensure that the current set of cookies belonging to the user are correctly mapped. While reference is made to cookies, other forms of anonymous identifiers that include or have been derived from the unique identifier or obfuscated identifier associated with a user can be used.

In some implementations, user session history information can be stored anonymously. For example, the session history information can include a user's browsing history, the times that the user has seen a particular advertisement, and other session history information. The information can be stored in association with the anonymous identifiers described herein. In some implementations, session history information associated with the user's session on a first device can be stored in a table that includes the anonymous identifier associated with the first device. The same table can also be used to store the same user's session history information for the user's session on a second device. In some implementations, a separate or the same table can be used to store associations among the anonymous identifiers. In some implementations, anonymous identifiers, the associations, and the session data all can be stored, for example, without any corresponding personally identifiable information for a given user.

As will be described in further detail below, subsequent to the storage of the association and session history information, a request for content (e.g., an advertisement) can be sent from any of the devices associated with that user (the request including an anonymous identifier associated with a given device). In some implementations, the session history information stored in the tables can be used in determining, for example, advertisements that may be of interest to the user responsive to the received request. The determination can include inferences for the user based on the user's stored session history information. In some implementations, the session history information for the user can be aggregated, e.g., by joining tables using the anonymous identifiers. For example, a request for content can be received, and the request can include an anonymous identifier associated with a user's desktop device. The received anonymous identifier can be used to look up the user's other anonymous identifiers (e.g., for mobile and other devices of the user). The retrieved set of anonymous identifiers can be used access to session history information in the other tables (e.g., user browsing history). In some implementations, all of the session history information can be joined together for the respective devices producing aggregated information. In some implementations, the aggregated session history information can be provided to a content management system in order to determine and select eligible content for delivery to the user responsive to the received request. For example, because the session history information can include the number of times that the user has seen a particular advertisement, the content management system can help to avoid selecting an advertisement for the user which has already been presented a predetermined number of times.

In some implementations, aggregating the information can occur on demand, e.g., in real time after a request for content occurs. For example, the user's session history information, stored individually by anonymous identifier in the various tables, can be joined. Aggregating the information in real time can solve issues, for example, related to whether the user has opted out of being provided content that may be of interest to the user and based on the devices used by the user. For example, session history information for a device for which the user has opted out will not be aggregated with other session history information. In some implementations, the information for a user can be aggregated and stored in advance of any requests for content. For example, all of the user session history information can be stored in a third table, e.g., that includes all of the user session history information across all of the user's devices.

Other ways of linking identifiers are possible. For example, identifiers, such as cookies, can be linked using various Diffie-Hellman techniques, e.g., that use exchanged secret and public keys.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the example environment 100 further includes a user login service 120 that can provide, for any particular user, access to the user's Web services, e-mail, social networks, business applications or other resources. For example, the user login service 120 can receive login requests from the user, such as through a Web browser or other application running on any device associated with the user. The login request can include, for example, the user's login ID (e.g., a unique identifier, an email address, a phone number, or any other identifier for the user that can be used for verifying the user at login). The user login service 120 can also maintain information related to the devices on which the user is currently logged on, or has been logged into recently. The information can include, for example, a mapping of anonymous identifiers for the devices with a user tag that does not contain personally identifiable information associated with the user. In some implementations, the mapping can be stored, for each user, in a data store of anonymous identifier associations 121, or in some data structure.

In some implementations, the anonymous identifier associations 121 or some other data store can store session history data for each user. For example, the session history data can be an aggregation of the information derived during each of a user's sessions from respective devices. In some implementations, the session history data can include timestamps that can be used, for example, to purge session history data for a user that is older than a threshold age. In some implementations, session history data can exist for as long as the user is logged into a session on one or more devices.

The environment 100 can include plural data stores, which can be stored locally by the content management system 110, stored somewhere else and accessible using the network 102, generated as needed from various data sources, or some combination thereof. A data store of bidders 123, for example, can include or represent content sponsors 108 who can bid on opportunities to present content. A data store of relative values 125, for example, can include a relative value of an identifier (e.g., cookie) determined for a respective bidder, indicating the determined value of an opportunity to present content to the user in association with the identifier. In some implementations, the content management system 110 can periodically estimate the relative values of identifiers (e.g., cookies) for each bidder (e.g., content sponsor), e.g., based on the bidder's past bidding history. For example, the more often and/or the higher that the bidder bids on a respective cookie, the more valuable that cookie may be to the bidder.

The content management system 110 can include plural engines. A bidding engine 130, for example, can identify bidders 123 that have expressed an interest in bidding on a content delivery opportunity associated with a received identifier (e.g., the cookie). A value determination engine 132, for example, can determine a relative value of an identifier to a respective bidder 123, the relative value reflecting a value of the opportunity to present content to a user or a device associated with a received identifier.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Other information, such as user identifier information that is associated with the mappings described above, can be used and/or evaluated when selecting eligible content.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by providing content that is selected based, at least in part, on identifier-relative, value-based bids, as described above. For example, an advertisement of greater interest to a user may be selected if content sponsors' bids are based on most valuable cookies, e.g., reflecting the user's entire experience as determined from multiple linked cookies.

Figure 2A:
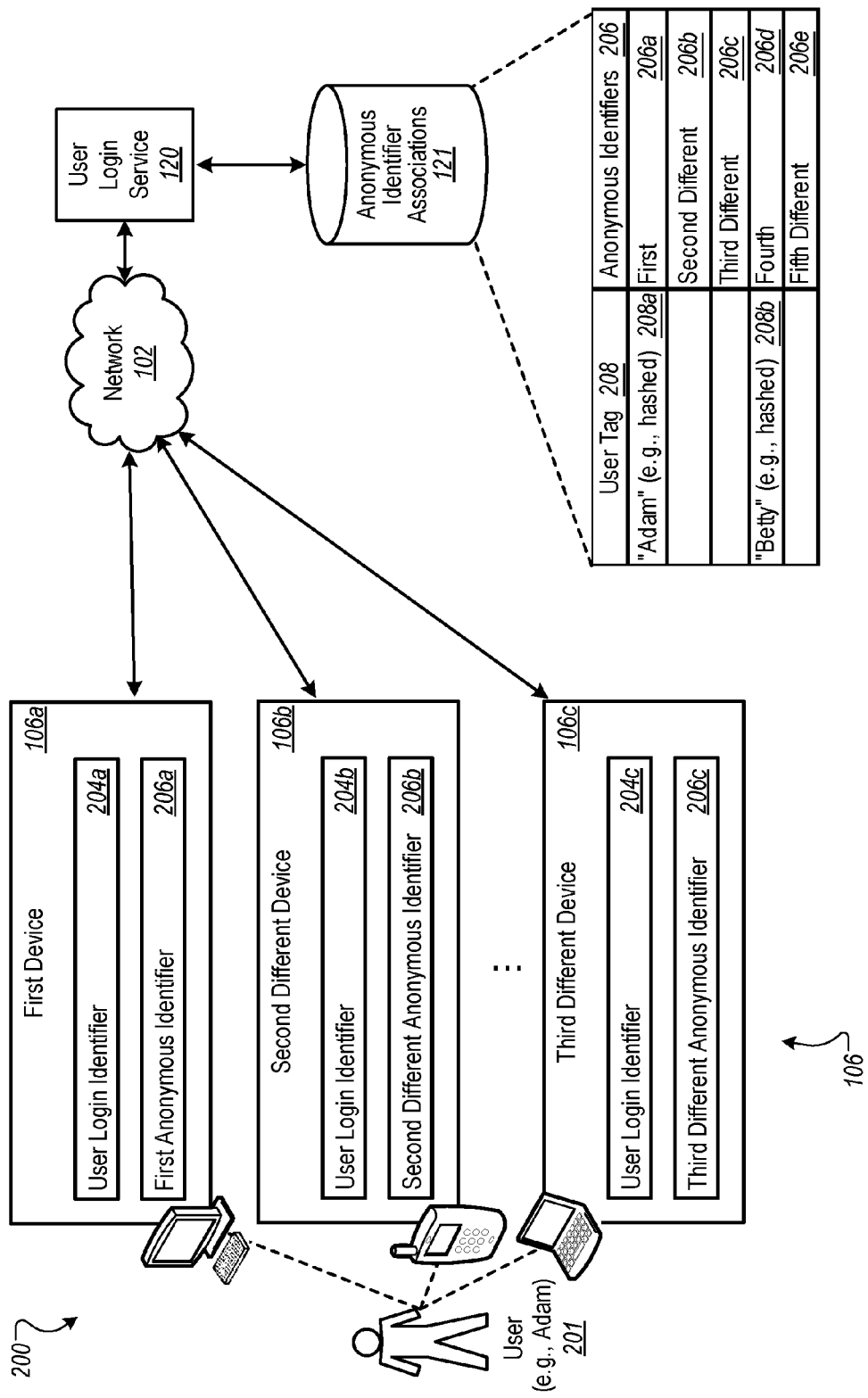
FIGS. 2A and 2B collectively show an example system for providing content to a user who is recognized when using multiple different devices.
Figure 2B:
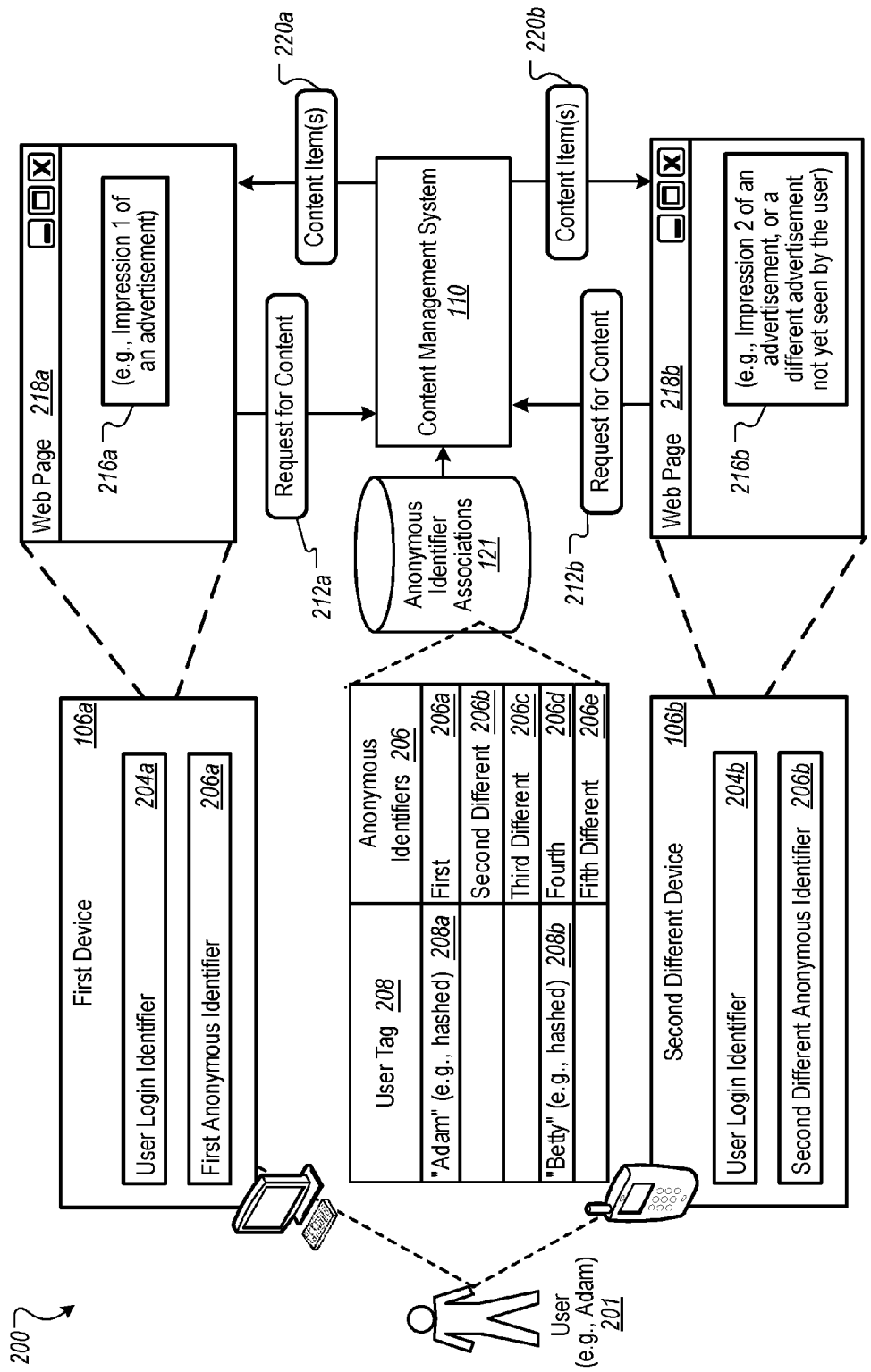

FIGS. 2A and 2B collectively show an example system 200 for providing content to a user who uses multiple devices 106 to retrieve information. For example, the devices 106 used by a user 201 (e.g., Adam) may include a first device 106a (e.g., Adam's home PC), a second device 106b (e.g., a mobile computing device such as Adam's smartphone), a third device 106c (e.g., Adam's work laptop computer), and/or other devices 106. Content that is served, e.g., by the content management system 110, to any of the devices 106 can depend on information that associates the user to all of the multiple devices 106.

Referring to FIG. 2A, the user 201 (e.g., Adam) can log into the user login service 120 from the first device 106a (e.g., Adam's home PC) using a user login identifier 204a that identifies Adam to the user login service 120. For example, the user login identifier 204a can include Adam's login ID (e.g., Adam Jones) or credentials and can be included in a first login request that is received by the login service 120 (e.g., to log Adam into a social service). The login request can be associated with a first anonymous identifier 206a (e.g., a cookie, a browser cookie, a device identifier, etc.) that is associated with the first device 106a.

In some implementations, the user login service 120 can determine a user tag 208a for the user 201, wherein the user tag 208a does not include any personally identifiable information associated with the user. Example personally identifiable information includes a login identifier associated with the user, the user's email address, the user's phone number, and so on.

In some implementations, the user login service 120 can determine the user tag 208a in different ways. For example, determining the user tag 208a can further include determining a random or pseudo-random number based at least in part on the personally identifiable information associated with the user, and the random or pseudo-random number can be provided as the user tag 208a. In some implementations, determining the user tag 208a can further include applying a one-way function (e.g., a hash function) to at least a portion of the personally identifiable information to produce a result, and the result can be used for the user tag 208a. In some implementations, other techniques for determining the user tag 208a can be used, and multiple techniques (e.g., including encryption) can be used in combination.

The user 201 may log into the login service 120 from the second different device 106b (e.g., Adam's smartphone or some other device) using a user login identifier 204b that also identifies Adam. For example, the user login identifier 204b can be the same login identifier that Adam used to log into the first device 106a. In some implementations, the login to the second different device 106b (e.g., Adam's smartphone) can occur while Adam is still logged into the first device 106a (e.g., Adam's home PC). During the second login, the user login service 120, for example, can receive a second login request from the second different device 106b. The second login request can be associated, for example, with a second anonymous identifier 206b (e.g., a cookie, a device identifier, etc.) associated with the second different device 106b.

In some implementations, the first and second different anonymous identifiers can be associated with different browsers. For example, the first device 106a and the second different device 106b can be the same device, but the first anonymous identifier 206a and the second anonymous identifier 206b can each be associated with a different browser. This can occur, for example, if the same user uses two different browsers.

In some implementations, the user login service 120 can store an association between the user tag 208a, the first anonymous identifier 206a, and the second different anonymous identifier 206b in the data store of anonymous identifier associations 121. In some implementations, associations can be stored as pairs that relate the user tags 208 to anonymous identifiers 206. In some implementations, the association that is stored excludes the user tag, as the user tag is the same for each of the login sessions. For example, the association that is stored in this example is between two or more anonymous identifiers. For example, the user tag 208a for Adam can be stored with a first anonymous identifier 206a that corresponds to Adam's login from the first device 106a (e.g., Adam's home PC). In another example, the same user tag 208a for Adam can be stored with a second different anonymous identifier 206b that corresponds to Adam's login from the second different device 106b (e.g., Adam's smartphone). As a result, an association is stored among a user's multiple anonymous identifiers.

Different techniques can be used for storing the association between the user tag 208a and the anonymous identifiers 206a and 206b. In some implementations, storing the association can include storing the information as entries or rows in a table, e.g., where the user tag is mapped to both the first and the second different anonymous identifiers using one or more entries or rows.

In some implementations, storing the association can include removing the user tag after expiration of a first time period and/or removing the second different anonymous identifier after expiration of a second time period. In some implementations, the first and the second time periods can be the same. In some implementations, the first and the second time periods can expire at logout by the user from the service. In some implementations, the first and the second time periods can expire after an amount of time has passed since login that would enable a user to have logged in from multiple different devices. Example amounts of time include substantially two days, substantially three days, substantially four days or substantially one week.

For example, associations that map the user tag associated with Adam to any of Adam's multiple user devices can remain stored for a few days or some other time period in which Adam is likely to log in from multiple different devices. In some implementations, information related to any of Adam's devices can be deleted upon Adam's exit from (or logging off of) the service.

Referring to FIG. 2B, the content management system 110 can receive a request for content 212a or 212b from either the first device 106a or the second different device 106b. For example, the request for content 212a can be a request for an advertisement to fill an advertisement slot 216a on a web page 218a. In another example, the request for content 212b can be a request for an advertisement to fill an advertisement slot 216b on a web page 218b. If the request for content 212a is from the first device 106a, for example, then the request for content can include the first anonymous identifier 206a. Otherwise, if the request for content 212b is from the second different device 106b, for example, then the request for content can include the second different anonymous identifier 206b.

Regardless of where the request for content originates, the content management system 110 can provide a content item (e.g., content items 220a or 220b) in response to the request and using information that maps the user tag to multiple devices (e.g., from the anonymous identifier associations 121). For example, the information can include the association among the user tag 208a, the first anonymous identifier 206a and the second different anonymous identifier 206b. Using this information, the content management system 110 can, for example, treat the requests for content as if they originate from the same user, regardless of the particular user device. In some implementations, identifying eligible content items for the request for content 212b, for example, can depend on content already provided to the same user (e.g., Adam) on the first device 106a. As a result, an advertisement for California vacations that is defined to be provided as one impression per user can be shown on Adam's first device 106a and not repeated again on Adam's second different device 106b. In some implementations, it can be beneficial to provide the same advertisement once and only once to each of the user's multiple devices.

Adam's devices 106a and 106b are two examples of devices that Adam may use. For example, Adam may use a third different device 106c (e.g., a work laptop computer). When Adam uses the third different device 106c to log in, for example, the user login service 120 can store a third different anonymous identifier 206c in the anonymous identifier associations 121. As a result, all three devices 106a-106c can be associated with the user tag 208a associated with Adam.

Similarly, other users (e.g., Betty) can use the user login service 120 for logging in from multiple different devices. As a result of Betty logging into a fourth and a fifth device, for example, the user login service 120 can store fourth and fifth different anonymous identifiers 206d and 206e in the anonymous identifier associations 121 (though those, of course, would be stored in association with Betty, not with Adam).

Figure 2C:
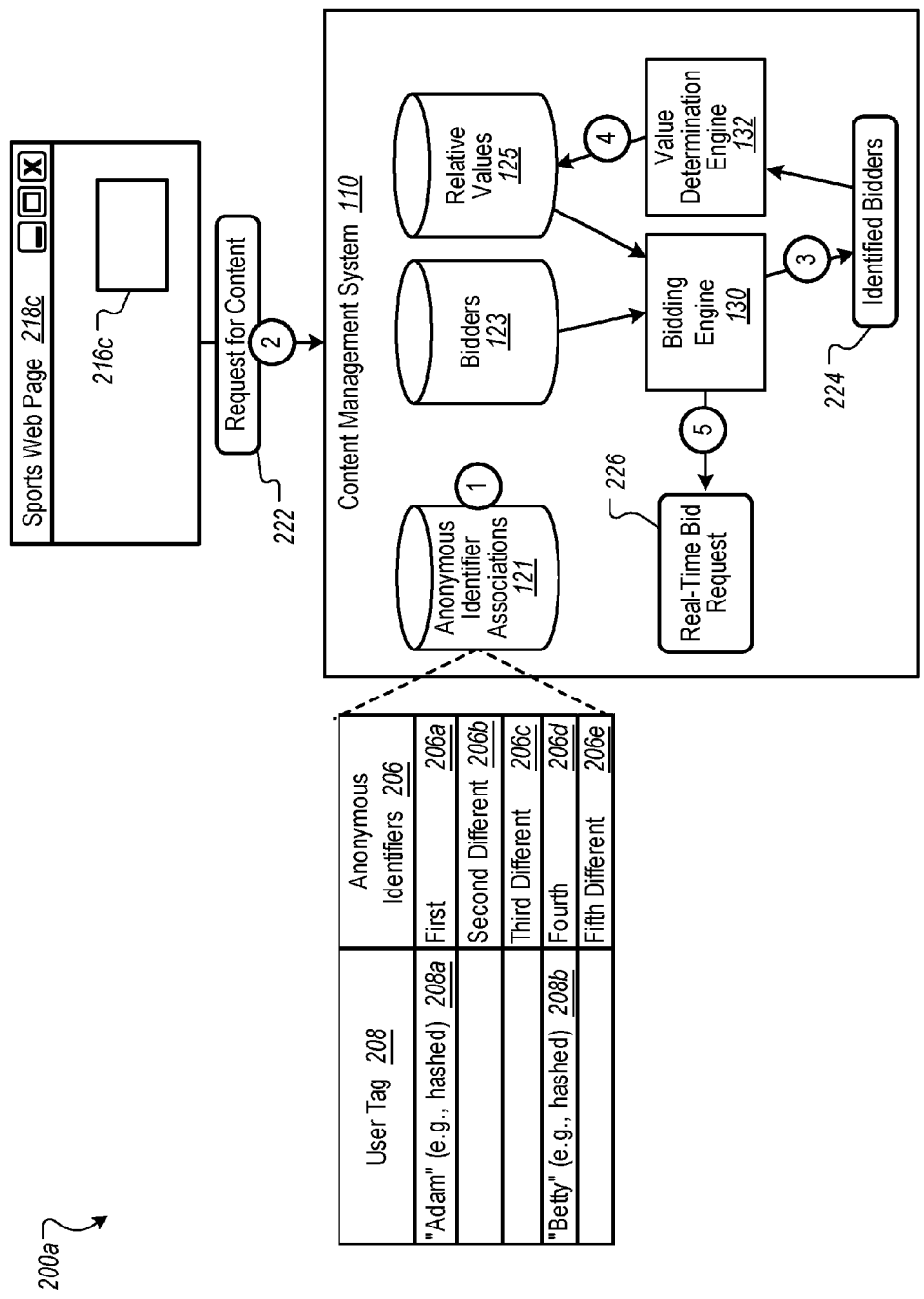
FIG. 2C is a block diagram of an example system for generating real-time bid requests based on relative values to bidders of identifiers associated with content requests.

FIG. 2C is a block diagram of an example system 200a for generating real-time bid requests based on relative values to bidders of identifiers associated with content requests. For example, the content management system 110 and/or its components can generate bid requests for bidders 123 based on relative values 125 for identifiers associated with the bidders. In some implementations, generating real-time bid requests in the system 200a can occur in the following example sequence of stages.

At stage 1, for example, the content management system 110 can generate the anonymous identifier associations 121, e.g., that link a plurality of identifiers (e.g., anonymous identifiers 206, such as cookies) for a user or a device. For example, as described above, the anonymous identifier associations 121 can be created by and used by the content management system 110. The content management system 110, for example, can provide a delivery service from inventory responsive to received requests for content. Each identifier of the anonymous identifier associations 121 can be associated with the user or the device in a specific context. The linking can include a first and second identifier, e.g., the first anonymous identifier 206a and the second different anonymous identifier 206b. In some implementations, more than two anonymous identifiers can be linked for a given user or a given device.

Specific contexts can include, for example, a specific resource (e.g., web page) associated with content presented to the user or the device and for which the identifier exists. The context can be characterized by one or more context value types, including, for example, previous behavior exhibited by the user or the device when interacting with a resource, demographics associated with the user, other profile information for the user, user interests, device characteristics associated with the device, and/or entities associated with content presented to the user or the device.

At stage 2, for example, the content management system 110 can receive a request for content 222 (e.g., a request for an advertisement), that includes either the first anonymous identifier 206a or the second different anonymous identifier 206b. For example, the request for content 222 can include a cookie associated with the user or user device accessing web page 218c (e.g., related to sports). The request for content 222 can be a request to fill content item slot 216c (e.g., an advertisement slot) on the resource.

At stage 3, for example, the bidding engine 130 can identify bidders 123 in an exchange that have expressed an interest in bidding on a content delivery opportunity associated with the user or the device based on the received first or second identifier. For example, the bidding engine 130 can use information in the received cookie (e.g., information associated with a sports resource and/or activities of the user on the sports resource) to identify content sponsors 108 who have an interest in bidding on that particular identifier, e.g., including opportunities to present advertisements for sports-related products to certain users.

At stage 4, for example, the value determination engine 132 can determine, for each bidder, a relative value 125 to a respective bidder of the opportunity to present content to the user or the device in association with each identifier that is known to the respective bidder. When the first and second identifiers are known to the bidder, for example, determining the relative value can include determining a highest value identifier from among the first and second identifier (e.g., for comparison between the two items). For example, the anonymous identifier associations can link all the identifiers, e.g., identifiers, such as cookies, associated with the particular user or device for which the request for content 222 is made.

In some implementations, determining the relative value can be based, at least in part, on context. For example, the first identifier may be a cookie that has relative value X to the bidder because of the user's past behavior (e.g., visiting the bidder's sports-related web site). The second identifier, for example, may be a cookie that has a relative value Y to the same bidder because of the user's demographics. For example, an identifier for a user or a device can have a higher relative value to a content sponsor if previous behavior exhibited by the user or the device in association with the given identifier includes purchases or other user actions of significant value to the bidder. User profile information for the user (e.g., user-supplied location information) and user interests (e.g., the user likes fast cars) can also be used in determining relative value. Some information can be used in combination, for example, with device characteristics associated with the device, such as if previous behavior exhibited by the user was on a mobile device as opposed to a non-mobile device. Other factors can be used in determining relative value. For example, the value can be based on entities associated with content presented to the user or the device, such as if a cookie is associated with a user visiting a web site associated with a manufacturer, an industry, or some other entity.

At stage 5, for example, the bidding engine 130 can generate, for each bidder, a real-time bid request in the exchange that includes the highest value identifier for submission to a respective bidder. For example, the bidding engine 130 can generate a real-time bid request 226 associated with each bidder 123, and a respective bid request can be associated with the highest relative value identifier (e.g., most valuable cookie) for that bidder, based on the linked identifiers.

Figure 3A:
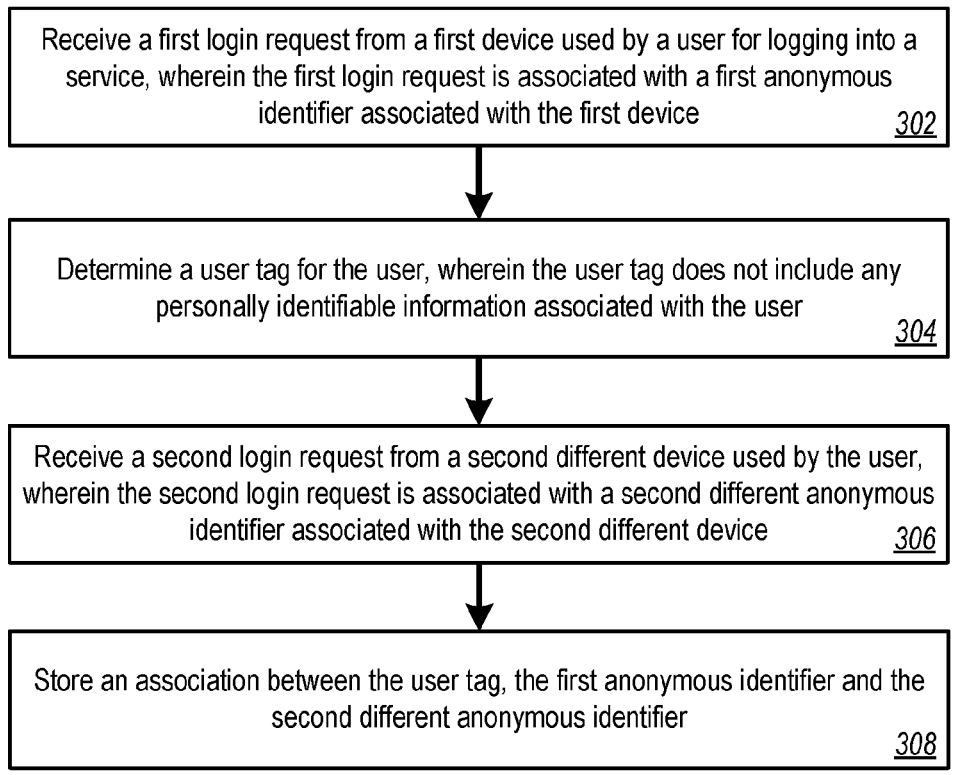
FIG. 3A is a flowchart of an example process for linking multiple devices associated with the user.

FIG. 3A is a flowchart of an example process 300 for linking multiple devices associated with the user. In some implementations, the content management system 110 and/or the user login service 120 can perform steps of the process 300 using instructions that are executed by one or more processors. FIGS. 1-2B are used to provide example structures for performing the steps of the process 300.

A first login request is received from a first device used by a user for logging into a service (302). The first login request is associated with a first anonymous identifier associated with the first device. For example, the user login service 120 can receive the first login request when the user 201 (e.g., Adam) logs into the first device 106a. The user login identifier 204a and the first anonymous identifier 206a can be included with the login request.

A user tag is determined for the user (304). In some implementations, the user tag does not include any personally identifiable information associated with the user. In some implementations, the user login service 120 can determine the user tag 208a using a one-way hash of the login identifier 204a (e.g., a hash of "Adam Jones"). In some implementations, the user login service 120 can determine the user tag 208a as a random or pseudo-random number based on the user's login identifier, e.g., using the user login identifier 204a as a seed. In some implementations, the user tag 208a can further be based, at least in part, on information included in the login request.

A second login request is received from a second different device used by the user (306). The second login request is associated with a second different anonymous identifier associated with the second different device. For example, the user login service 120 can receive the second login request when the user 201 (e.g., Adam) logs into the service from the second different device 106b (e.g., Adam's smartphone). The user login identifier 204b and the second anonymous identifier 206b can be included with the login request.

An association is stored that is between the user tag, the first anonymous identifier and the second different anonymous identifier (308). For example, the user login service 120 can store an association between the user tag 208a, the first anonymous identifier 206a, and the second different anonymous identifier 206b in anonymous identifier associations 121. In some implementations, in order to create the association, the same user tag can be created for the user regardless of on which device the login request originated. For example, the user tag generated for the second request can be the same as the user tag generated for the first request if the user tag is generated using a one-way hash function of the user login identifier. In this way, the user tag can be the same every time the user logs in from any device.

The stored association can be used in numerous ways. For example, the stored association can be used to select content for delivery to a user (e.g., based on any of a group of linked identifiers). Another use includes identifying all known identifiers for a user and determining a highest value identifier, such as is described in greater detail below.

In some implementations, the process 300 can include additional steps, e.g., to process a third login request. For example, a login request can be received (e.g., by the user login service 120) from a third device (e.g., device 106c) used by the user. The login request can be associated with a third different anonymous identifier 206c associated with the third device 106c. An association can be stored that associates the user tag 208a, the first anonymous identifier 206a, the second different anonymous identifier 206b and the third different anonymous identifier 206c.

In some implementations, linking of identifiers can be content sponsor specific. For example, a cookie associated with sponsor A can be linked to a second cookie of sponsor A for a different device, as well as other cookies associated with sponsor A. However, cookies that have nothing to do with sponsor A (i.e., cookies that are owned by sponsor B) won't be linked to cookies of sponsor B.

FIG. 3B is a flowchart of an example process 380 for generating real-time bid requests based on relative values to bidders of identifiers associated with content requests. In some implementations, the content management system 110 and the user login service 120 can perform steps of the process 380 using instructions that are executed by one or more processors. FIGS. 1-2C are used to provide example structures for performing the steps of the process 380.

A linking is provided of a plurality of identifiers for a user or a device that is known to a service (382). In some implementations, the service is a content delivery service that delivers content from inventory responsive to received requests for content. In some implementations, each identifier is associated with the user or the device in a specific context, the linking including a first and second identifier. For example, the content management system 110 can generate the anonymous identifier associations 121 as described above with reference to FIGS. 2A-2B.

In some implementations, providing the linking can include providing a linking of plural cookies that are associated with a single user or a single device. For example, anonymous identifiers 206 that are linked in the anonymous identifier associations 121 can be associated with the same user across multiple devices. In another example, the linked identifiers can be associated with the same device, such as associated with a browser on the device and some number of apps on the device and/or other identifiers.

A request for content is received, the request for content including either the first or second identifier (384). For example, the content management system 110 can receive the request for content 222. In some implementations, the request for content 222 can include a first cookie, e.g., a browser cookie that is associated with the sports web page 218c and the user of the device on which the sports web page 218c is displayed.

Bidders in an exchange are identified that have expressed an interest in bidding on a content delivery opportunity associated with the user or the device based on the received first or second identifier (386). For example, the bidding engine 130 can identify bidders 123 that have expressed an interest in bidding on a content delivery opportunity associated with the user or the device based on the received first or second identifier. The identification can be based on information in the received cookie (e.g., associated with sports), such as to identify content sponsors 108 who have an interest in bidding on that particular identifier, e.g., including opportunities to present advertisements for sports-related products. Identification can also be based on other information included in the request, such as keywords or other criteria for selecting from among eligible content items to provide responsive to the request.

For each bidder, a relative value is determined that is a value to a respective bidder of the opportunity to present content to the user or the device in association with each identifier (of the plurality of linked identifiers) that is known to the respective bidder (388). For example, the value determination engine 132 can determine, for each bidder, a relative value 125 to a respective bidder of the opportunity to present content to the user or the device in association with each identifier that is known to the respective bidder. When the first and second identifiers are known to the bidder, for example, determining the relative value can include determining a highest value identifier from among the first and second identifier. For example, the value determination engine 132 can determine the highest relative value from among the relative values for the all for the identifiers that are linked to the identifier for with which the request for content 222 is associated.

In some implementations, determining the relative value can include estimating the relative value. For example, the value determination engine 132 can determine a particular relative value for an identifier based on available information, including based on contexts and context types, as described above.

In some implementations, estimating the relative value can be based, at least in part, on previous bidding frequency and amounts of bidder bids on a respective identifier. As an example, the value determination engine 132 can determine a particular relative value based, at least in part, on a bidder's previous bids (e.g., amounts and frequencies) on an identifier (e.g., cookie).

In some implementations, estimating the relative value can include periodically updating the estimates based on bidder activities in the exchange. For example, the value determination engine 132 can periodically determine relative values for identifiers based on bids that bidders have made, such as to identify an average value to a bidder or trending (e.g., increasing) values to a bidder.

In some implementations, determining the relative value can include looking up a stored value provided by a respective bidder. As an example, content sponsors 108 who are bidders on content delivery opportunities can specify relative values for particular identifiers, such as cookies. A content sponsor 108 may do this, for example, if the user associated with the cookie has made purchases on a web page associated with the content sponsor. In some implementations, content sponsors 108 can designate low relative values for identifiers, such as for cookies that are associated with users who rarely, if ever, make a purchase on the content sponsor's web page. In some implementations, relative values for identifiers can be designated using a numeric score or some other designator (e.g., high, medium, low, etc.).

In some implementations, the process 380 can further include determining if a relative value has been provided by a bidder, and when so, using the provided relative value, and when not, estimating the relative value. For example, the value determination engine 132 can determine if a relative value for a particular identifier already exists in the relative values 125, and if so, use that value.

In some implementations, estimating the relative value can be based at least in part on prior bidding activity of the bidder. As an example, the value determination engine 132 can determine an identifier's relative value, for a respective bidder, based on that bidder's bidding history relative to the identifier. The bidding history can include bidding history information such as frequencies of bids, amounts of bids, times at which the bids occurred, and/or other information. In some implementations, relative values of identifiers can depend on the time of day, e.g., if the bidder has a bidding pattern that indicates different values to the bidder at different times of the day (or other time periods).

For one or more of the bidders, a real-time bid request is generated in the exchange that includes the highest value identifier for submission to a respective bidder (390). For example, the bidding engine 130 can generate the real-time bid request 226 bid associated with each bidder 123, wherein a respective bid request is associated with the highest relative value identifier (e.g., most valuable cookie) for that bidder, based on the linked identifiers.

In some implementations, the request for content can include a first cookie, and generating the real-time bid request can include generating a bid request for a respective bidder that includes a second different cookie that is linked to the first cookie. For example, although the request for content 222 can identify a particular cookie (e.g., associated with the sports web page 318b), the cookie that is included with the real-time bid request 226 can be a second cookie, linked to the first cookie, and that has a higher relative value than the relative value of the first cookie.

In some implementations, the process 380 can further include providing the real-time bid request to the bidder. For example, the content management system 110 can provide a respective real-time bid request 226 to the associated bidder 123.

In some implementations, the process 380 can further include using the linking for conversion tracking. For example, the anonymous identifier associations 121 can be used to track conversions by users across devices, e.g., converting on a second device after being provided with content on a first device.

Figure 4:
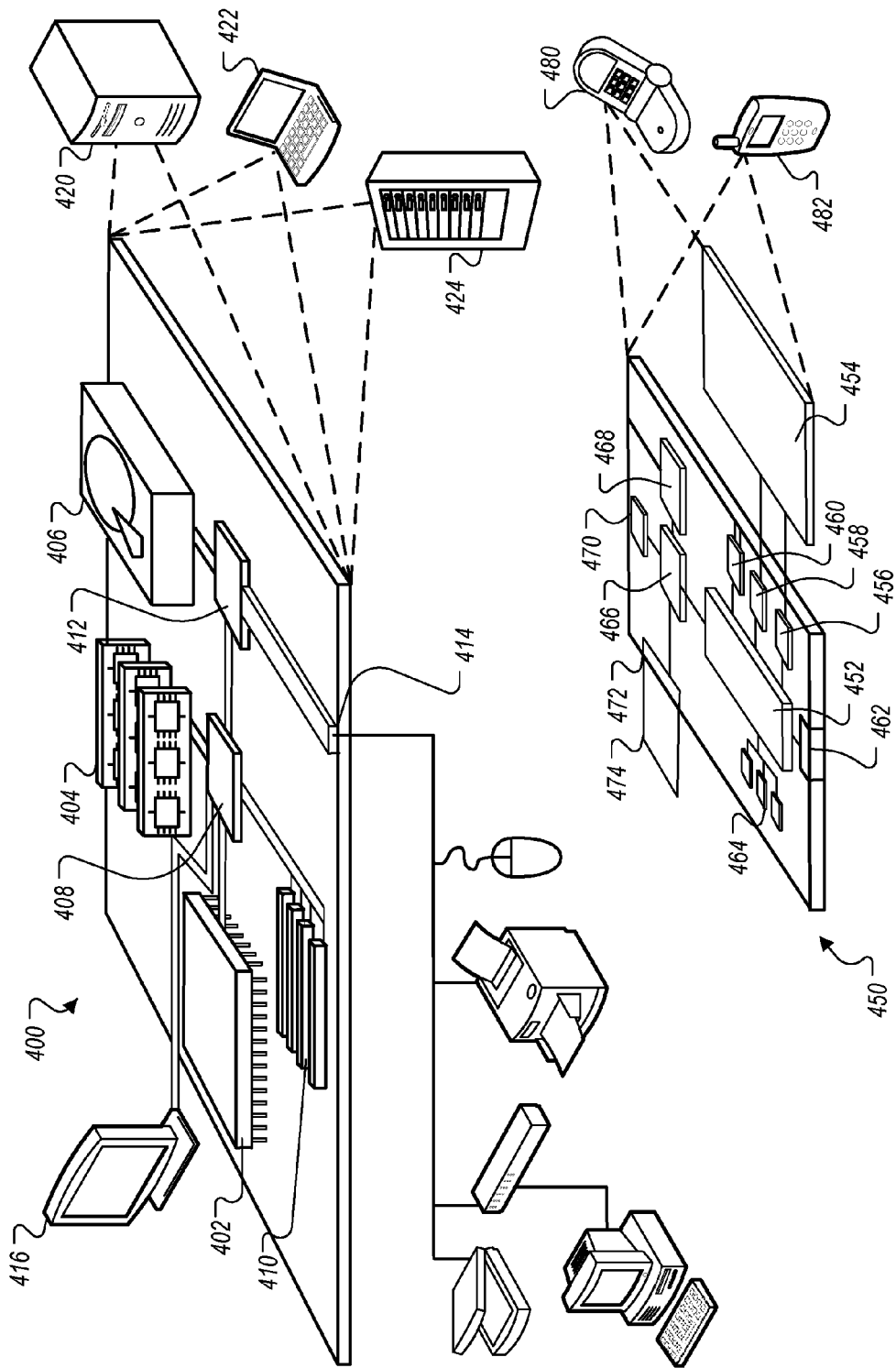
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   providing, by one or more processors, a linking of a plurality of identifiers for a user that is known to a content delivery service wherein each identifier is associated with the user in a specific context, including mapping each of a first anonymous identifier and a second anonymous identifier to a same user tag representing the user, the mapping comprising:
   receiving, from a first device, a first login request to access a given user account;
   assigning the first anonymous identifier to the first device;
   mapping, in a data structure, the first anonymous identifier to the same user tag representing the user;
   receiving, from a second device, a second login request to access the given user account;
   assigning the second anonymous identifier to the same user tag representing the user; and
   mapping, in the data structure, the second anonymous identifier to the same user tag representing the user;
   receiving a request for content, the request for content identifying one of the first anonymous identifier or the second anonymous identifier;
   determining, by the one or more processors, that the user submitted the request for content based on the mapping, in the data structure, of the same user tag to the one of the first anonymous identifier or the second anonymous identifier that was identified in the request for content;
   identifying, using the one or more processors, bidders in an exchange that have expressed an interest in bidding on a content delivery opportunity for requests that include either of the first anonymous identifier or the second anonymous identifier that have been assigned to the same user tag;
   generating a real-time bid request in the exchange for one of the identified bidders, the real-time bid request being generated using both of the first anonymous identifier and the second anonymous identifier, but identifying only one of the first anonymous identifier or the second anonymous identifier; and
   after a specified amount of time, removing the mapping of the first anonymous identifier or the second anonymous identifier to the same user tag.

2. The computer-implemented method of claim 1, further comprising determining a relative value to a respective bidder of an opportunity to present content to the user that is associated with the first anonymous identifier and the second anonymous identifier, wherein generating the real-time bid request comprises including, in the real-time bid request, only one of the first anonymous identifier or second anonymous identifier that has a highest relative value to the respective bidder.

3. The computer-implemented method of claim 2 wherein determining the relative value includes estimating the relative value.

4. The computer-implemented method of claim 3 wherein estimating the relative value is based, at least in part, on previous bidding frequency and amounts of bidder bids on a respective identifier.

5. The computer-implemented method of claim 1 further comprising using the linking for conversion tracking.

6. The computer-implemented method of claim 1 wherein the specific context is a specific resource associated with content presented to the user or the device, and wherein the specific context is characterized by one or more context types, including: previous behavior exhibited by the user or the device, demographics associated with the user, user profile information for the user, user interests, device characteristics associated with the device, or entities associated with content presented to the user or the device.

7. The computer-implemented method of claim 6 wherein determining the relative value is based, at least in part, on the one or more context types.

8. A non-transitory computer-readable medium storing instructions, that when executed, cause one or more processors to perform operations including:
providing a linking of a plurality of identifiers for a user that is known to a content delivery service wherein each identifier is associated with the user in a specific context, including mapping each of a first anonymous identifier and a second anonymous identifier to a same user tag representing the user, the mapping comprising:
receiving, from a first device, a first login request to access a given user account;
assigning the first anonymous identifier to the first device;
mapping, in a data structure, the first anonymous identifier to the same user tag representing the user;
receiving, from a second device, a second login request to access the given user account;
assigning the second anonymous identifier to the same user tag representing the user; and
mapping, in the data structure, the second anonymous identifier to the same user tag representing the user;
receiving a request for content, the request for content identifying one of the first anonymous identifier or the second anonymous identifier;
determining that the user submitted the request for content based on the mapping, in the data structure, of the same user tag to the one of the first anonymous identifier or the second anonymous identifier that was identified in the request for content;
identifying bidders in an exchange that have expressed an interest in bidding on a content delivery opportunity for requests that include either of the first anonymous identifier or the second anonymous identifier that have been assigned to the same user tag;
generating a real-time bid request in the exchange for one of the identified bidders, the real-time bid request being generated using both of the first anonymous identifier and the second anonymous identifier, but identifying only one of the first anonymous identifier or the second anonymous identifier; and
after a specified amount of time, removing the mapping of the first anonymous identifier or the second anonymous identifier to the same user tag.

9. The non-transitory computer-readable medium of claim 8, wherein the instructions cause the one or more processors to perform operations further comprising determining a relative value to a respective bidder of an opportunity to present content to the user that is associated with the first anonymous identifier and the second anonymous identifier, wherein generating the real-time bid request comprises including, in the real-time bid request, only one of the first anonymous identifier or second anonymous identifier that has a highest relative value to the respective bidder.

10. The non-transitory computer-readable medium of claim 9 wherein determining the relative value includes estimating the relative value.

11. The non-transitory computer-readable medium of claim 10 wherein estimating the relative value is based, at least in part, on previous bidding frequency and amounts of bidder bids on a respective identifier.

12. The non-transitory computer-readable medium of claim 10, wherein the instructions cause the one or more processors to perform operations further comprising using the linking for conversion tracking.

13. The non-transitory computer-readable medium of claim 10 wherein the specific context is a specific resource associated with content presented to the user or the device, and wherein the specific context is characterized by one or more context types, including: previous behavior exhibited by the user or the device, demographics associated with the user, user profile information for the user, user interests, device characteristics associated with the device, or entities associated with content presented to the user or the device.

14. A system comprising:
one or more processors; and
one or more memory elements including instructions that, when executed, cause the one or more processors to perform operations comprising:
providing a linking of a plurality of identifiers for a user that is known to a content delivery service wherein each identifier is associated with the user in a specific context, including mapping each of a first anonymous identifier and a second anonymous identifier to a same user tag representing the user, the mapping comprising:
receiving, from a first device, a first login request to access a given user account;
assigning the first anonymous identifier to the first device;
mapping, in a data structure, the first anonymous identifier to the same user tag representing the user;
receiving, from a second device, a second login request to access the given user account;
assigning the second anonymous identifier to the same user tag representing the user; and
mapping, in the data structure, the second anonymous identifier to the same user tag representing the user;
receiving a request for content, the request for content identifying one of the first anonymous identifier or the second anonymous identifier;
determining that the user submitted the request for content based on the mapping, in the data structure, of the same user tag to the one of the first anonymous identifier or the second anonymous identifier that was identified in the request for content;
identifying bidders in an exchange that have expressed an interest in bidding on a content delivery opportunity for requests that include either of the first anonymous identifier or the second anonymous identifier that have been assigned to the same user tag;
generating a real-time bid request in the exchange for one of the identified bidders, the real-time bid request being generated using both of the first anonymous identifier and the second anonymous identifier, but identifying only one of the first anonymous identifier or the second anonymous identifier; and
after a specified amount of time, removing the mapping of the first anonymous identifier or the second anonymous identifier to the same user tag.

15. The system of claim 14, wherein the instructions cause the one or more processors to perform operations further comprising determining a relative value to a respective bidder of an opportunity to present content to the user that is associated with the first anonymous identifier and the second anonymous identifier, wherein generating the real-time bid request comprises including, in the real-time bid request, only one of the first anonymous identifier or second anonymous identifier that has a highest relative value to the respective bidder.

16. The system of claim 15 wherein determining the relative value includes estimating the relative value.

17. The system of claim 16 wherein estimating the relative value is based, at least in part, on previous bidding frequency and amounts of bidder bids on a respective identifier.

18. The system of claim 14, wherein the instructions cause the one or more processors to perform operations further comprising using the linking for conversion tracking.

19. The system of claim 14 wherein the specific context is a specific resource associated with content presented to the user or the device, and wherein the specific context is characterized by one or more context types, including: previous behavior exhibited by the user or the device, demographics associated with the user, user profile information for the user, user interests, device characteristics associated with the device, or entities associated with content presented to the user or the device.

* * * * *